US008861007B2

(12) United States Patent  (10) Patent No.: US 8,861,007 B2
Langevin et al.  (45) Date of Patent: Oct. 14, 2014

(54) COMPUTER LANGUAGE TRANSLATION FILTER

(71) Applicant: ZIH Corp., Lincolnshire, IL (US)

(72) Inventors: David A. Langevin, Warwick, RI (US); Blake Nemura, Saint Charles, IL (US)

(73) Assignee: ZIH Corp., Lincolnshire, IL (US)

( * ) Notice: Subject to any disclaimer, the term of this patent is extended or adjusted under 35 U.S.C. 154(b) by 0 days.

(21) Appl. No.: 13/856,979

(22) Filed: Apr. 4, 2013

(65) Prior Publication Data

US 2013/0268946 A1   Oct. 10, 2013

Related U.S. Application Data

(60) Provisional application No. 61/620,375, filed on Apr. 4, 2012.

(51) Int. Cl.
*G06F 3/12*   (2006.01)
(52) U.S. Cl.
CPC ................. *G06F 3/1297* (2013.01)
USPC ....................................................... 358/1.15
(58) Field of Classification Search
CPC ...... G06F 9/541; G06F 3/1228; G06F 3/1297
USPC ........................................................ 715/276
See application file for complete search history.

(56) References Cited

U.S. PATENT DOCUMENTS

| 5,402,527 | A  | * | 3/1995  | Bigby et al. ................ 358/1.1 |
| 7,627,833 | B2 |   | 12/2009 | McKnight et al. |
| 7,988,051 | B2 |   | 8/2011  | Alleshouse |
| 2006/0023239 | A1 | * | 2/2006 | Ferlitsch ................... 358/1.13 |
| 2006/0245005 | A1 |   | 11/2006 | Hall et al. |
| 2011/0219272 | A1 | * | 9/2011 | Lai et al. ......................... 714/54 |

FOREIGN PATENT DOCUMENTS

| EP | 0 280 039 A1 | 8/1988 |
| EP | 0 621 530 A2 | 10/1994 |
| EP | 0621530 B1 * | 11/2004 | ............... G06F 3/12 |

OTHER PUBLICATIONS

PCT International Search Report for application PCT/2013/035302 mailed Oct. 4, 2013.
PCT Written Opinion of the International Searching Authority for application PCT/2013/035302 mailed Oct. 4, 2013.

* cited by examiner

*Primary Examiner* — Brian W Wathen
(74) *Attorney, Agent, or Firm* — Alston & Bird LLP (57) ABSTRACT

Provided herein are devices, systems, methods and various means, including those related to translating command and other types of computer instructions being transmitted to a destination processor from a language that is non-native to the destination processor to a language that is native to the destination processor. Some embodiments discussed herein can include a processing filter that is configured to identify whether incoming instructions are formatted in a translatable non-native language of the destination processor and, if so, process the non-native commands into native commands. The processed, native commands can then be relayed to the destination processor by some embodiments discussed herein. The processing filter can be implemented in a manner that is portable and independent of any specific framework and/or programming language. For example, the processing functionality (including the identification and translation features discussed herein) can be implemented in the same device as the destination processor and/or at a system remote from the destination device (e.g., at a remote host system).

23 Claims, 5 Drawing Sheets

COMPUTER LANGUAGE TRANSLATION FILTER

CROSS-REFERENCE TO RELATED APPLICATION

This application is a non-provisional of and claims the benefit of U.S. Provisional Patent Application No. 61/620,375, filed Apr. 4, 2012, which is incorporated by reference herein in its entirety.

FIELD

Embodiments of the present invention relate generally to routing data streams and, more particularly, relate to methods, apparatuses, systems and other means for routing data streams based on the language in which the data is formatted.

BACKGROUND

Embodiments of the present invention are directed to filtering data streams transmitted by a host device to a destination device. While data stream filtering has been performed in the past, a number of deficiencies and problems have been identified. Through applied effort, ingenuity, and innovation, solutions to many of these identified problems are provided by various embodiments of the present invention, some examples of which are detailed herein.

BRIEF SUMMARY

In general, embodiments of the present invention provide improvements by, among other things, processing a data stream including commands formatted in one or more computer programming languages, which may include page description and printer control languages. Commands being transmitted to a destination processor can be in a language that is foreign, sometimes referred to herein as "non-native," to the destination processor which may be included in circuitry. Some embodiments discussed herein can include a processing filter that is configured to identify whether incoming commands are to be translated. The processing filter can be configured to determine whether incoming commands are native or non-native to the destination processor and, when non-native, process the non-native commands into native commands.

In some embodiments, the processor can be configured to test the commands to determine whether the commands are formatted in one or more specific non-native languages. The processor can be configured to test the commands to determine whether the commands are formatted in one or more specific native languages. In response to determining the commands are formatted in a manner other than the tested non-native formats and/or in response to determining the commands are formatted in one or more specific native languages, the commands can be passed through without being filtered and/or otherwise processed. In response to determining the commands are formatted in accordance with one of the tested non-native formats, the commands can be processed into a native format. The processed, native commands can then be relayed to the destination processor by some embodiments discussed herein. The processing filter can be implemented in a manner that is portable and independent of any specific framework and/or programming language. For example, the processing functionality (including the identification and translation features discussed herein) can be implemented in the same device as the destination processor and/or at a system remote from the destination device (e.g., at a remote host system).

Some example embodiments include a method of processing data comprising: receiving data formatted in a first language via a first logical channel, wherein the data is from a host machine and includes instructions to be executed by a processor of a destination machine; determining whether the first language is to be filtered. In response to determining the first language is not one of the languages intended to be filtered, the data is passed to the processor of the destination machine; and in response to determining the first language is passed to the processor of the destination machine: providing the data to the processor of the destination machine via a second logical channel and generating a filter bypass indicator associated with the host machine, wherein the filter bypass indicator is configured to cause return data to bypass a return translation filter via a third logical channel when the return data is generated by the destination machine for the host machine.

In additional embodiments, receiving the data formatted in the first language via the first logical channel can comprise receiving the data as a STDIN data stream. Some example methods can include providing the new data to the processor via the second logical channel as a STDOUT data stream.

The method can further comprise: generating internal communications data to communicate with the processor of the destination machine; providing the internal communications data to the destination machine via a third logical channel; and receiving internal response data from the processor via a fourth logical channel.

As yet another example, the method of providing the internal communications data to the destination machine via the third logical channel can comprises providing the internal communications data as a SYSIN data stream. Additionally or instead, the method of receiving the internal response data from the processor via the fourth logical channel can comprise receiving the internal communications data as a SYSOUT data stream. Further, some embodiments may include: receiving the return data from the destination machine for the host machine; in response to receiving the return data from the destination machine, determining the filter bypass indicator is associated with the host machine; and in response to determining the filter bypass indicator is associated with the host machine, facilitating the return data being provided to the host machine by bypassing a translational filter.

As another example, some embodiments can include a method of processing data comprising: receiving data formatted in a first language via a first logical channel, wherein the data is from a host machine and includes instructions to be executed by a processor of a destination machine; determining whether the first language is non-native to the processor of the destination machine by, e.g., determining if the first language is one of a predefined non-native languages; in response to determining the first language is non-native to the processor of the destination device, identifying the instructions included in the data; generating new data in a native language that is supported by the processor of the destination machine, wherein the new data includes the instructions in the native language; providing the new data to the processor of the destination machine over a second logical channel; generating internal communications data to communicate with the processor of the destination machine; providing the internal communications data to the destination machine via a third logical channel; and receiving internal response data from the processor via a fourth logical channel.

A fifth logical channel can also be provided that is configured to provide return data generated by the destination device in response to the new data, wherein the return data is directed to the host machine. Additionally, in some embodiments, the return data can be translated to be formatted in accordance with the first language. The return data can be outputted as formatted in accordance with the first language via a STDERR data stream.

Some embodiments can include providing a sixth logical channel configured to provide unfiltered return data generated by the destination device in response to the destination device being configured to generate the unfiltered return data in a host language format that the host machine is configured to interpret, wherein the host language is non-native to the destination device.

A STDIN data stream can be used to receive the data formatted in the first language via the first logical channel and/or a STDOUT data stream can be used to provide the new data to the processor over the second logical channel comprises providing the new data via a STDOUT data stream.

Some embodiments may also include an apparatus, comprising a translation processor configured to: receive data formatted in a first language via a first logical channel, wherein the data is from a host machine and includes instructions to be executed by a processor of a destination machine; determine whether the first language is recognized as being translatable; and in response to determining the native language is unrecognized as being translatable: provide the data to the processor of the destination machine via a second logical channel; and generate a filter bypass indicator associated with the host machine, wherein the filter bypass indicator is configured to cause return data to bypass a translation filter via a third logical channel when the return data is generated by the destination machine for the host machine.

One example apparatus can also, or alternatively, be configured to: receive un-translated data formatted in a non-native language via the first logical channel, wherein the un-translated data is from a second host machine and includes un-translated instructions to be executed by the processor of the destination machine; determine the non-native language is unsupported by the processor of the destination machine; in response to determining the non-native language is unsupported by the processor of the destination machine, identifying the instructions included in the un-translated data; generate translated data in a native language that is supported by the processor of the destination machine, wherein the new data includes translated instructions in the native language that correspond to the un-translated instructions; and provide the translated data to the processor of the destination machine over the second logical channel.

In some embodiments, the apparatus can be embedded in the destination device. In other embodiments, the apparatus can be located remote from the destination device.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1A:
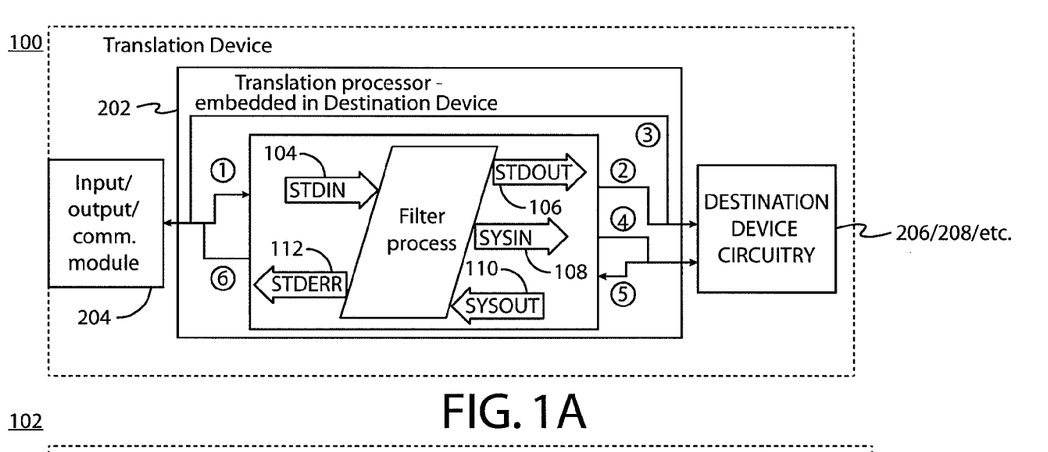
FIGS. 1A and 1B show example logical configurations of computer language translation filters in accordance with some embodiments discussed herein.
Figure 1B:
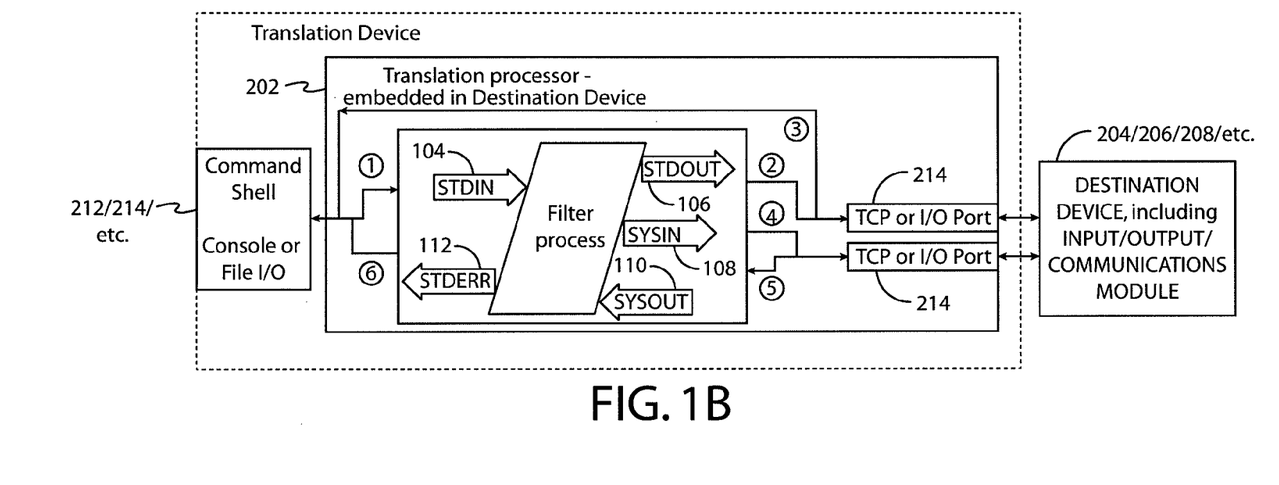

In accordance with some embodiments discussed herein, FIGS. 1A and 1B show example logical configurations of computer language translation filters, namely filter configuration 100 and filter configuration 102 respectively. Although many of the examples discussed herein are related to translating communications between printing devices and host devices that generate printing instructions (which may include executable commands, data requests, etc.), some embodiments can be used in connection with other types of devices that may involve generating and/or otherwise conducting communications with another device.

Figure 2A:
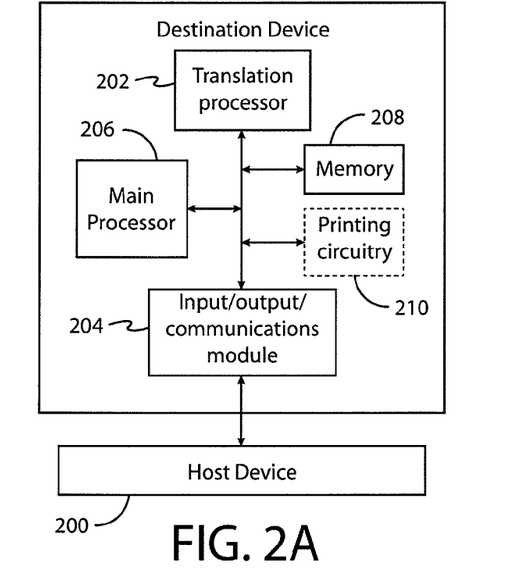
FIGS. 2A and 2B show example hardware that may be configured to provide the translation filters discussed in connection with FIGS. 1A and 1B in accordance with some embodiments discussed herein.

Turning first to filter configuration 100, an example logical configuration is shown that can be provided when the translation functionality is performed by circuitry and/or other hardware, firmware and/or software embedded or otherwise included in the destination device, such as those embodiments shown in FIG. 2A. For example, the functionality provided by filter configuration 100 may be performed by translation processor 202, which may receive input data from host device 200 via input/output/communications module 204 before relaying the translated data over a common bus and/or other communications path to main processor 206 of the destination device.

As noted above, some embodiments of the destination device may include a printer and/or any other type of machine configured to execute instructions in one or more computer programming languages, such as one or more printer control languages, that are native to the destination device. As referred to herein, "native language" refers to a printer control language and/or other computer programming language that is supported by the destination device. Also, "non-native language" refers to a printer control language and/or other type of computer programming language that is not supported by the destination device.

For example, the destination device may be a printer configured to receive printing instructions formatted in accordance with the Zebra Programing Language ("ZPL") or with ZPL II, while host device 200 may be a computer, cellular phone, tablet, and/or any other device configured to generate printing instructions and/or otherwise communicate with a printer and/or other destination device in a host language that may or may not be compliant with ZPL or ZPL II. The host language may be non-native to the destination device. In this example, ZPL or ZPL II are the destination device's native languages and, when the host language is a non-native language, the host device's instructions may be un-interpretable by the destination device, unless filter 100 and/or something similar is implemented.

Filter 100 of FIG. 1A can be configured to receive and output data using any suitable type of data streams, including standard streams (e.g., standard input (STDIN), standard output (STDOUT) and standard error (STDERR)). For example, as represented by arrow 104, host data can be received as a STDIN input stream into the filter process via logical channel 1. As referred to herein, "logical channel" refers to the path that data takes from one part of the system to another. Example filter processes are discussed further in connection with, e.g., FIGS. 3-5, and may be performed by translation processor 202 and/or various other components discussed further in connection with FIGS. 2A and 2B.

In some embodiments, the filter process can be configured to cause circuitry to determine the language of the host data received, determine whether the host data is formatted one or more particular non-native languages (e.g., by analyzing one or more commands received), and pass the host data received to the destination device unless the host data is determined to be formatted in one or more of the non-native languages filter 100 is configured to recognize and translate. In these embodiments, only host data that is determined to be in a non-native language that the circuitry is configured to translate (sometimes referred to herein as a "translatable non-native language") is filtered and translated by filter 100. All other data is passed through filter 100, including data in the destination device's native language as well as data in non-native languages that the circuitry is not configured to identify and/or translate.

In other embodiments, the filter process can be configured to cause circuitry to determine the language of the host data received, determine whether the host data is formatted in a language native to the destination device, and/or translate the instructions and/or other data included in the host data into a native language of the destination device. In response to determining that the host data is in a native language of the destination device, the host data can be outputted along logical channel 2 as a STDOUT stream by the filter process to the destination devices circuitry 206/208/etc.

In response to determining the host data is formatted in a translatable non-native language, the filter process can be configured to translate the instructions and/or other aspects of the host data into native instructions and/or other native data that is interpretable by the destination device, and provide the translated data formatted in the native language to the destination device via STDOUT stream represented by arrow 106 along logical channel 2. In this regard, according to some embodiments, the filter process acts as a filter by only performing translation operations on data that is determined to be formatted in a translatable non-native language of the destination device.

For example, the destination device's native language may be the Comtec Printer Control Language ("CPCL"). An example of CPCL formatted commands are shown below.

```
! 0 200 200 200 1
    TEXT 0 0 50 50 CPCL Text - Font 0 size 0 @50,50
    FORM
    PRINT
```

As another example, the destination device may be a printer configured to receive commands formatted in ZPL. An example of ZPL formatted commands are shown below.

```
^XA^MNN^LL200
^FO50,50^AAN^FDZPL Text - Font A, default size @50,50^FS
^XZ
```

When a destination device has ZPL as its native language and receives commands in another language, such as the Toshiba TEC language ("TPCL"), some embodiments discussed herein may be configured to translate the TPCL commands into ZPL commands. For example, the following are TPCL commands.

```
{D0250,0720,0250|}
{C|}
{PC001;0062,0062,1,1,G,00,B=TPCL Text - Font G @50,50|}
{XS;I,0001,0002CA200|}
```

In some embodiments, in response to receiving the above TPCL commands as inputted host data, machines discussed herein can be configured to output a ZPL translation of the above. Shown below is an example ZPL translation of the above TPCL commands.

```
^XA^PQ0001,000,0,Y^JST^PON^MNN^LL200^PW576
^FN001^FT50,50,0^FPH,0.5^A@N,25,25,E:ARIMO-REGULARG.TTF^FS
^FN001^FH_^FDTPCL Text - Font G @50,50^FS
^XZ
```

When the host data is provided to translation processor 202 formatted in a language native to the destination device, translation processor 202 can be configured to store a filter bypass indicator in memory, such as memory 208 discussed further in connection with FIG. 2A. The filter bypass indicator can comprise one or more bits of data that can be associated with host device identifying data, such as internet protocol address and/or communications port number, among other things associated with the payload data (e.g., the formatted print commands).

In response to receiving return data generated by the destination device and intended for the host device, translation processor 202 and/or other circuitry discussed herein can be configured to first determine whether the return data is directed to a host device that is associated with a filter bypass indicator stored in memory. If so and/or if the targeted host device previously communicated with the destination device in a language native to the destination device and/or in a non-translatable, non-native language of the destination device, the filter process and/or other translation-related functionality can be bypassed when facilitating the routing of the return data to the host device. For example, as shown by logical channel 3 in FIG. 1A, return data from the destination device (e.g., query responses) from native pass-thru data can be routed to the host device without undergoing the filter process. In this regard, processing power can be reserved for communications that can be translated and corresponding speed reductions for communications between devices can be avoided or at least lessened.

As shown in FIGS. 1A and 2A, internal query requests and other communications between, for example, embedded translation processor 202 and/or other components of the destination device, such as main processor 206, can be routed along logical channels 4 and 5 via SYSIN stream (represented by arrow 108) and SYSOUT stream (represented by arrow 110), respectively. Internal communications between, for example, translation processor 202 and main processor 206 can be routed on a separate channel or channels than communications involving the host device. For example, when the host device communicates data in a translatable non-native language and/or after the filter process translates host data (and, e.g., saves a translatable indicator in memory, etc.), return data to that host device may be translated back into the host device's translatable non-native language and sent to the host device as STDERR stream (as represented by arrow 112) over logical channel 6. As such, return data can be translated into a non-native language of the host device in response to determining that the host previously sent host data that was able to be translated into the native language of the destination device.

Figure 2B:
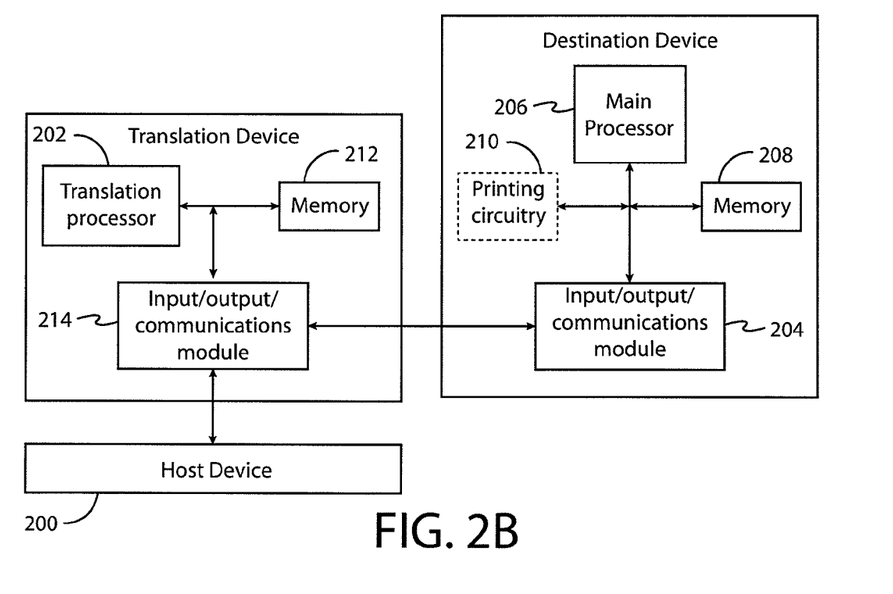

Turning next to filter configuration 102, an example logical configuration is shown that can be provided when the translation functionality is performed by circuitry and/other hardware located external to or otherwise remote from the internal circuitry of the destination device, such as in embodiments in accordance with that shown in FIG. 2B. For example, filter configuration 102 can be implemented in a translation device that includes its own memory 212 and input/output/communications modules 214. In some embodiments, the translation device can be implemented as a universal serial bus (USB) device, Bluetooth device, any other type of device with communications functionality, and/or any combination thereof. The functionality provided by filter configuration 102 may be performed by translation processor 202 similar to that discussed in connection with FIGS. 1A and 2A. For example, while translation device may be configured to include a command shell, operating system, and/or input/output protocols that are separate from the destination device and/or the host device, processor 202 may receive input data from host device 200 via input/output/communications modules 214 before relaying the translated data via another component of input/output/communications modules 214 to the destination device.

As shown in FIGS. 1B and 2B, internal query requests and other communications between, for example, remote translation processor 202 and components of the destination device, such as main processor 206, can be routed through a TCP, input/output, and/or any other type of component of input/output/communications modules 214 to logical routes 4 and 5 via SYSIN stream (represented by arrow 108) and SYSOUT stream (represented by arrow 110), respectively. Communications between, for example, translation processor 202 and main processor 206 that are not intended to involve the host device can be routed on a separate logical channel or logical channels other than those channels used for communications involving the host device. For example, when the host device communicates data in a non-native language and/or after the filter process translates host data (and, e.g., saves a translatable indicator in memory, etc.), return data to that host may be translated back into the host data's non-native language and sent to the host device (e.g., as STDERR stream and) as represented by arrow 112 over logical channel 6. As such, return data can be translated into a non-native language of the destination device in response to determining the host device previously sent host data that needed to be translated into the native language of the destination device. Because six logical channels are used, the filtering configurations shown in FIGS. 1A and 1B can be considered two different examples of a Hexa-Directional Data Translation Filter.

FIGS. 2A and 2B show example hardware that may be configured to provide the translation filters discussed in connection with FIGS. 1A and 1B, respectively. In accordance with some example embodiments, destination devices and/or translation devices can each include various means, such as translation processor 202, input/output/communications module 204, main processor 206, memory 208, printing circuitry 210 (and/or other specialized circuitry that is not shown, such as battery hardware, which may aid in facilitating the functionality of the destination device), memory 212, and/or input/output/communications modules 214 for performing the various functions herein described. As referred to herein, "module" includes hardware, software and/or firmware configured to perform one or more particular functions. In this regard, the destination devices and/or translation devices as described herein may be embodied as, for example, hardware elements (e.g., a suitably programmed processor, combinational logic circuit, internal busses, and/or other types of circuitry), a computer program product comprising computer-readable program instructions stored on a non-transitory computer-readable medium (e.g., memory 208 and/or memory 212) that is executable by a suitably configured processing device (e.g., translation processor 202 and/or main processor 206), or some combination thereof.

Translation processor 202 and/or main processor 206 may, for example, each be embodied as various means including one or more microprocessors with accompanying digital signal processor(s), one or more processor(s) without an accompanying digital signal processor, one or more coprocessors, one or more multi-core processors, one or more controllers, processing circuitry, various other processing elements including integrated circuits such as, for example, an ASIC (application specific integrated circuit) or FPGA (field programmable gate array), or some combination thereof. Accordingly, although each is illustrated in FIGS. 2A and 2B as a single processor, in some embodiments, translation processor 202 and/or main processor 206 each comprises a plurality of processors. The plurality of processors may be embodied on a single computing device or may be distributed across a plurality of computing devices collectively configured to function as the destination device and/or translation device. The plurality of processors may be in operative communication with each other and may be collectively configured to perform one or more functionalities of destination device and/or translation device as described herein. For example, main processor 206 may be configured to perform functionalities in a native language, and translation processor 202 may be configured to translate data and/or other commands that may cause, result from or otherwise support the functionalities of the main processor 206. In an example embodiment, translation processor 202 and/or main processor 206 is each configured to execute instructions stored in memory 208, memory 212 and/or other storage device accessible to translation processor 202 and/or main processor 206. These instructions, when executed by translation processor 202 and/or main processor 206, may cause destination device and/or translation device to perform one or more of the filtering functionalities described herein, among other functionality not explicitly discussed herein.

Whether configured by hardware, firmware, or software methods, or by a combination thereof, translation processor 202 and/or main processor 206 may each comprise an entity capable of performing operations according to embodiments of the present invention while configured accordingly. Thus, for example, when translation processor 202 and/or main processor 206 are embodied as an ASIC, FPGA or the like, translation processor 202 and/or main processor 206 may each comprise specifically configured hardware for conducting one or more operations described herein. Alternatively, as another example, when translation processor 202 and/or main processor 206 is embodied as an executor of instructions, such as may be stored in memory 208 and/or memory 212, the instructions may specifically configure translation processor 202 and/or main processor 206 to perform one or more algorithms and operations described herein.

Memory 208 and/or memory 212 may each comprise, for example, volatile memory, non-volatile memory, or some combination thereof. Although illustrated in FIGS. 2A and 2B as a single memory, memory 208 and/or memory 212 may each comprise a plurality of memory components. The plurality of memory components may be embodied on a single computing device or distributed across a plurality of computing devices. In various embodiments, memory 208 and/or memory 212 may each comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 208 and/or memory 212 may each be configured to store information, data, applications, instructions, or the like for enabling the translation device and/or destination device to carry out various functions in accordance with example embodiments of the present invention. For example, in at least some embodiments, memory 208 and/or memory 212 can be configured to store data used to identify one or more particular translatable non-native languages of the destination device as well as buffer un-translated input data for processing by processor 202 and/or main processor 206. Additionally or alternatively, in at least some embodiments, memory 208 and/or memory 212 can be configured to store program instructions for execution by processor 202 and/or main processor 206. Memory 208 and/or memory 212 may store information in the form of static and/or dynamic information. This stored information may be stored and/or used by the destination device and/or translation device during the course of performing its functionalities.

Input/output/communications module 204 and/or input/output/communications modules 214 may each be embodied as any device or means embodied in circuitry, hardware, a computer program product comprising computer readable program instructions stored on a computer readable medium (e.g., memory 208 and/or memory 212) and executed by a processing device (e.g., translation processor 202 and/or main processor 206), or a combination thereof that is configured to receive and/or transmit data from/to another device, such as, for example, a host device and/or the like. In some embodiments, input/output/communications module 204 and/or input/output/communications modules 214 (like other components discussed herein) can each be at least partially embodied as or otherwise controlled by translation processor 202 and/or main processor 206. In this regard, input/output/communications module 204 and/or input/output/communications modules 214 may each be in communication with translation processor 202 and/or main processor 206, such as via a bus.

Input/output/communications module 204 and/or input/output/communications modules 214 may each include, for example, an antenna, a transmitter, a receiver, a transceiver, network interface card and/or supporting hardware and/or firmware/software for enabling communications with another computing device. Additionally or alternatively, input/output/communications module 204 and/or input/output/communications modules 214 may each be configured to support for, for example, a keyboard, a mouse, a keypad, a display screen, a touch screen display, a microphone, a speaker, a RFID reader, barcode reader, and/or other input/output mechanisms used to communicate data to/from humans and/or other machines. Input/output/communications module 204 and/or input/output/communications modules 214 may each be configured to receive and/or transmit any data that may be stored by memory 208 and/or memory 212 using any protocol that may be used for communications between computing devices. Input/output/communications module 204 and/or input/output/communications modules 214 may each additionally or alternatively be in communication with the memory 208 and/or memory 212 and/or any other component of the translation device and/or destination device, such as via a bus.

Figure 3:
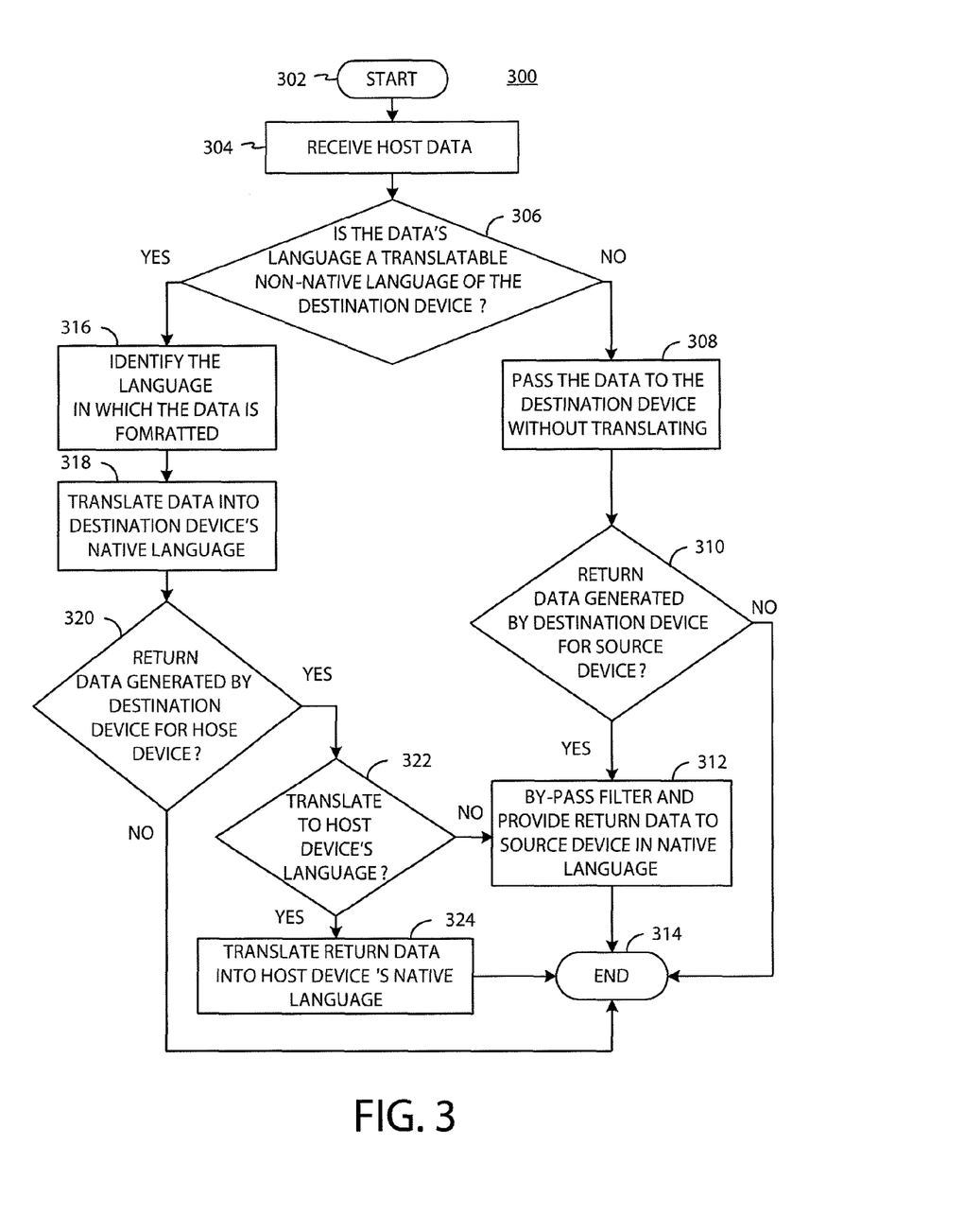
FIG. 3 shows a flow diagram of an example method of determining and processing data based on whether the data is formatted in a language that is native to a device in accordance with some embodiments discussed herein.
Figure 4:
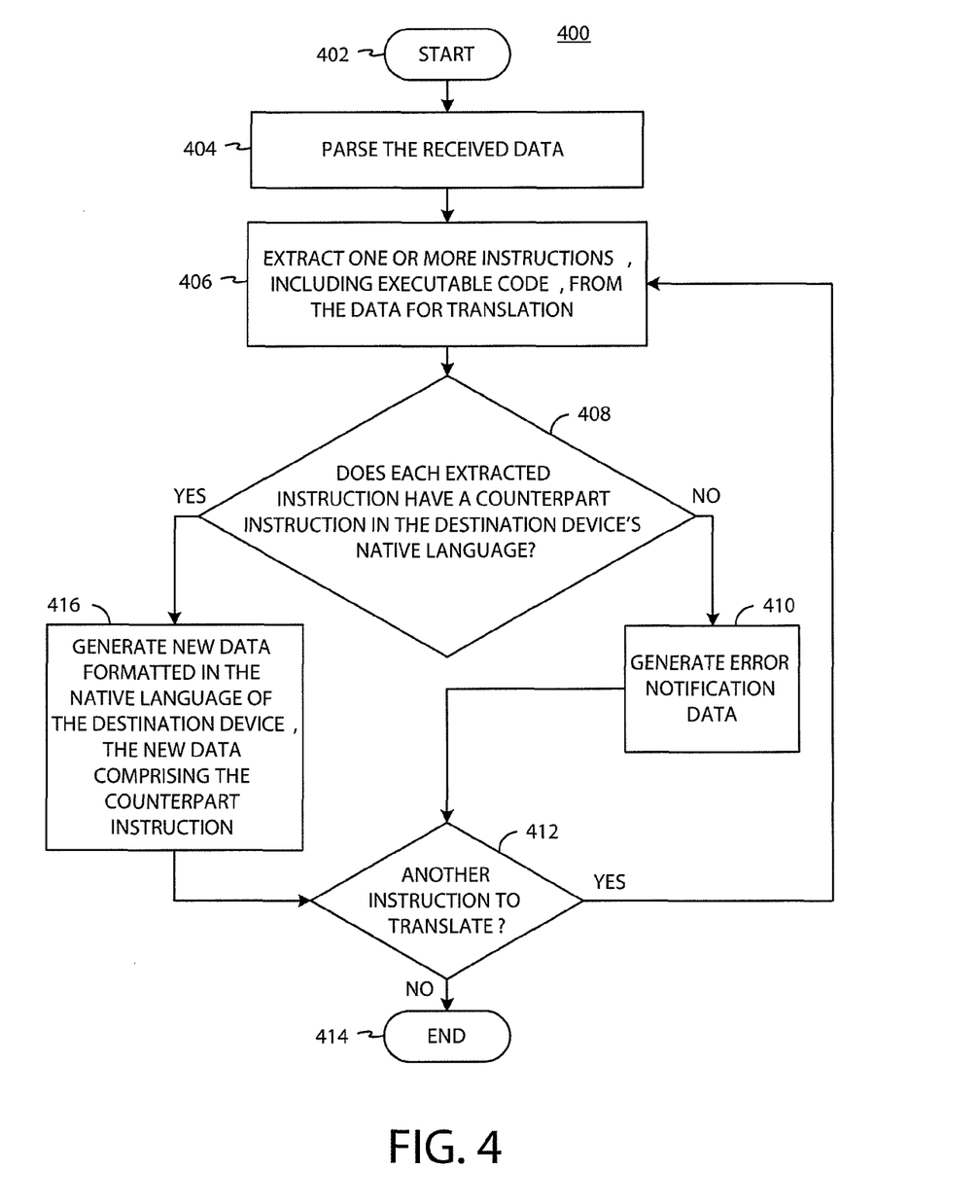
FIG. 4 shows a flow diagram of an example method of parsing received data in accordance with some embodiments discussed herein.
Figure 5:
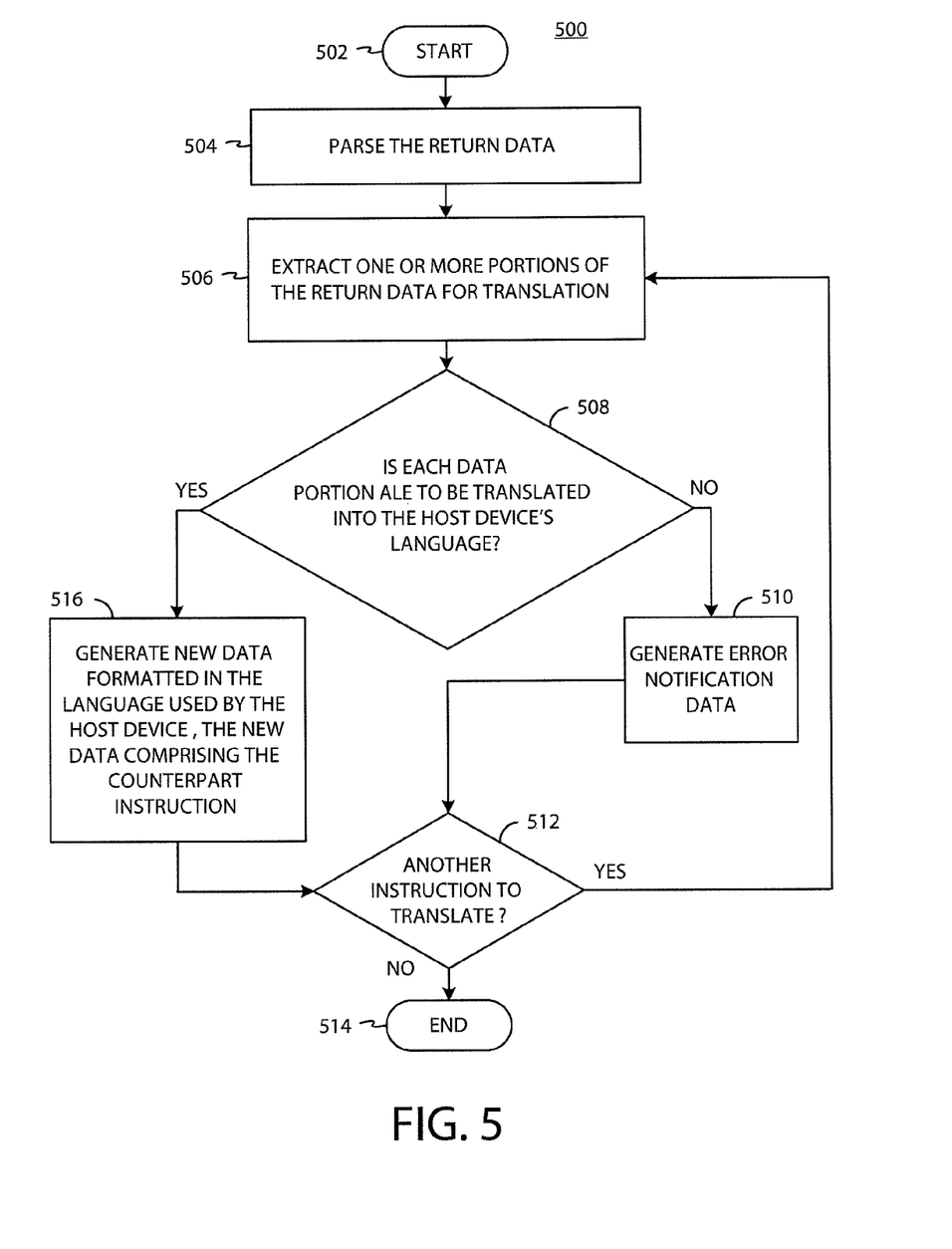
FIG. 5 shows a flow diagram of an example method of parsing returned data in accordance with some embodiments discussed herein.

FIGS. 3-5 show example processes, namely processes 300, 400 and 500, respectively. Each of the shown processes include example operations that may be executed by various components of the destination device and/or translation device to perform the filtering and/or other translational functionality discussed herein. For example, non-transitory computer readable media can be configured to store firmware, one or more application programs, and/or other software, which include instructions and other computer-readable program code portions that can be executed to control each processor (e.g., translation processor 202 and/or main processor 206) of the components of the system, including a host device, translation device and/or destination device, to implement various operations, including the examples shown in FIGS. 3-5. As such, a series of computer-readable program code portions are embodied in one or more computer program products and can be used, with a computing device, server, and/or other programmable apparatus, to produce a machine-implemented process. As will be appreciated by one of ordinary skill in the art, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

Process 300 starts at 302, and proceeds to 304 where host data is received. At 306, a determination is made as to whether the host data is formatted in a translatable non-native language of the destination device. In other embodiments, a different determination can instead or additionally be made. For example, a determination can be made as to whether the host data is formatted in a language that is native to the destination device (as opposed to whether the language is in a translatable non-native language). Regardless of which types of determinations are being performed, one or more tests may be executed at 306 to determine whether the host data is to be passed or translated, including tests as to whether the syntax of the data being received is recognized as being a translatable non-native language of the destination device, among others.

In response to determining at 306 that the host data is to be passed without being filtered, the host data may be passed to the destination device at 308 formatted in the language as it was received. For example, logical channel 106 of FIGS. 1A and 1B may be used to pass un-translated host data. In some embodiments, a filter bypass indicator may be generated and stored at 308.

At 310, a determination can be made when return data is received whether the return data is intended for the translation processor/device or for the host device. When intended for the translation processor/device, logical channels 4 and 5 of FIGS. 1A and 1B can be used to communicate between the destination device and the translation processor/device and process 300 can end at 314.

In response to determining at 310 that the return data is intended for the host device, process 300 proceeds to 312 and the return data can be transmitted to the host data over logical channel 3 shown in FIGS. 1A and 1B, thereby bypassing the translation process and passing through the translation filter unaltered. Process 300 can end at 314 after 312.

Returning to 306, in response to determining that host data is formatted in a translatable non-native language of the destination device, the language of the host data can be identified at 316 and translated into a format native to the destination device at 318. FIG. 4 shows an example process illustrating how such translation may be performed.

Subsequently, if return data is generated and received from the destination device at the translation processor/device, a determination can be made at 320 whether the return data is intended for the host device or the translation processor/device. When intended for the translation processor/device, logical channels 4 and 5 of FIGS. 1A and 1B can be used to communicate between the destination device and the translation processor/device and process 300 can end at 314.

In response to determining at 320 that the return data is intended for the host device, process 300 proceeds to 322 and determines if the return data should be translated back to the host device's language. In response to determining at 322 that the destination device's language need not and/or cannot be translated for the host device (because, e.g., the host device is known to be configured to interpret destination device's native language, the host device is known to include a translation device/processor such as that discussed in connection with the destination device, etc.), process 300 can proceed to and end at 314.

In response to determining at 322 that the destination device's language should and/or can be translated for the host device, process 300 can proceed to 324 and translate the return data into the host device's native language. FIG. 5 shows an example process that may be performed at 324. The resulting data may then be provided over logical channel 6. Process 300 may then end at 314.

FIG. 4 shows process 400 that can begin at 402 and proceed to 404 to parse the host data. For example, at 404, the translation processor/device can be configured to break the inputted host data stream received over logical channel 1 (shown in FIGS. 1A and 1B) into its parts and analyze each.

At 406, one or more instructions can be extracted for translation based on the parsing of the host data. As referred to herein, instructions include data commands and/or any other executable program code. In some embodiments, more than just the instructions may be extracted for translation.

At 408, a determination can be made as to whether each extracted instruction has a counterpart instruction in a native language of the destination device. For example, the host device may be configured to instruct a printer to print in a format that is not possible to be printed using the native language of the destination device. In response to determining at 408 that there is no counterpart instruction in the destination device's native language, an error notification can be generated and presented to the user and/or stored in memory at 410.

At 412, a determination is made as to whether or not there is another instruction (and/or other data portion) to be translated. If so, process 400 returns to 406. If not, process 400 ends at 414.

Returning to the discussion of 408, in response to determining 408 that there is a counterpart instruction in the destination device's native language, new data formatted in the native language of the destination device can be generated at 416. The new data can comprise the counterpart instruction of that received from the host device. Process 400 then proceeds to 412 discussed above.

FIG. 5 shows process 500 which can begin at 502 and proceed to 504 and parse the returned data. For example, at 504 the translation processor/device can be configured to break the input data stream from the destination device into its parts and analyze each portion.

At 506, one or more portions can be extracted for translation based on the parsing of the return data. For example, payload portions, header portions, translatable portions, and/or any other portions of the return data can be extracted for translation.

At 508, a determination can be made as to whether each extracted portion is able to be translated into the host device's language. For example, data may have been saved during the initial translation process that identifies the host device's language. In response to determining at 508 that there is no counterpart instruction in the host device's language, an error notification can be generated and presented to the user and/or stored in memory at 510.

At 512, a determination can be made as to whether or not there is another return data portion to be translated. If so, process 500 returns to 506. If not, process 500 ends at 514.

Returning to the discussion of 508, in response to determining 508 there is a counterpart instruction in the host device's language, new data formatted in the host device's language can be generated at 516. The new data can comprise the counterpart instruction of that received from the destination device. Process 500 then proceeds to 512.

As described above and as will be appreciated based on this disclosure, embodiments of the present invention may be configured as methods, systems, apparatuses, and/or non-transitory computer readable media. Accordingly, embodiments may comprise various means including entirely of hardware or any combination of software and hardware. Furthermore, embodiments that take the form of a computer program product on at least one non-transitory computer-readable storage medium can include computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as translation processor 202 and/or main processor 206 discussed above with reference to FIGS. 2A and 2B, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 208 and/or memory 212) that can direct a computer or other programmable data processing apparatus (e.g., translation processor 202 and/or main processor 206) to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of processing data comprising:
receiving data from a host machine that is formatted in a first language via a first logical channel, wherein the data comprises instructions to be executed by circuitry of a destination machine;
determining, by a processor, whether to translate the data;
in response to determining the data is to be outputted without being translated:
providing the data as formatted in the first language to the circuitry of the destination machine via a second logical channel; and
generating a filter bypass indicator associated with the host machine, wherein the filter bypass indicator is configured to cause return data to bypass a translation filter via a third logical channel when the return data is generated by the destination machine for the host machine.

2. The method of claim 1, wherein determining whether to translate the data comprises determining whether the first language is recognized as being translatable by the processor.

3. The method of claim 1, wherein determining whether to translate the data comprises determining whether the first language is a native language of the destination device.

4. The method of claim 1, wherein receiving the data formatted in the first language via the first logical channel comprises receiving the data as a STDIN data stream.

5. The method of claim 1, wherein providing the data to the circuitry via the second logical channel comprises providing the data as a STDOUT data stream.

6. The method of claim 1 further comprising:
generating internal communications data to communicate with the circuitry of the destination machine;
providing the internal communications data to the destination machine via a third logical channel; and
receiving internal response data from the circuitry via a fourth logical channel.

7. The method of claim 6, wherein providing the internal communications data to the destination machine via the third logical channel comprises providing the internal communications data as a SYSIN data stream.

8. The method of claim 7, wherein receiving the internal response data from the circuitry via the fourth logical channel comprises receiving the internal communications data as a SYSOUT data stream.

9. The method of claim 1 further comprising:
receiving the return data from the destination machine for the host machine;
in response to receiving the return data from the destination machine, determining the filter bypass indicator is associated with the host machine; and
in response to determining the filter bypass indicator is associated with the host machine, facilitating the return data being provided to the host machine by bypassing a translational filter.

10. a method of processing data comprising:
receiving data formatted in a first language via a first logical channel, wherein the data is from a host machine and includes to be executed by a circuitry of a destination machine;
determining, by a processor, whether the first language is recognized as being translatable;
in response to determining the first language is recognized as being translatable, identifying the instructions included in the data;
generating new data in a native language that is supported by the circuitry of the destination machine, wherein the new data includes the instructions in the native language;
providing the new data to the circuitry of the destination machine over a second logical channel;
generating internal communications data to communicate with circuitry of the destination machine;
providing the internal communications data to the destination machine via a third logical channel;
receiving internal response data from the circuitry via a fourth logical channel; and
providing a fifth logical channel configured to provide unfiltered return data generated by the destination machine in response to the destination machine being configured to generate the unfiltered return data in a host language format that the host machine is configured to interpret.

11. The method of claim 10 further comprising providing a sixth logical channel configured to provide return data generated by the destination machine in response to the new data, wherein the return data is directed to the host machine.

12. The method of claim 11 further comprising translating the return data to be formatted in accordance with the first language.

13. The method of claim 12 further comprising outputting the return data as formatted in accordance with the first language via a STDERR data stream.

14. The method of claim 10, wherein receiving the data formatted in the first language via the first logical channel comprises receiving the data via a STDIN data stream.

15. The method of claim 10, wherein providing the new data to the circuitry over the second logical channel comprises providing the new data via a STDOUT data stream.

16. An apparatus, comprising:
a translation processor configured to:
receive data formatted in a first language via a first logical channel, wherein the data is from a host machine and includes instructions to be executed by circuitry of a destination machine;
determine whether to translate the data;

in response to determining the data is to be outputted without being translated:
provide the data as formatted in the first language to the circuitry of the destination machine via a second logical channel; and
generate a filter bypass indicator associated with the host machine, wherein the filter bypass indicator is configured to cause return data to bypass a translation filter via a third logical channel when the return data is generated by the destination machine for the host machine.

17. The apparatus of claim 16, wherein the translation processor is further configured to:
receive the return data from the destination machine for the host machine;
in response to receiving the return data from the destination machine, determine the filter bypass indicator is associated with the host machine; and
in response to determining the filter bypass indicator is associated with the host machine, facilitate the return data being provided to the host machine by bypassing a translational filter.

18. The apparatus of claim 16, wherein the translation processor is further configured to:
receive un-translated data formatted in a non-native language via the first logical channel, wherein the un-translated data is from a second host machine and includes un-translated instructions to be executed by the circuitry of the destination machine;
determine the non-native language is unsupported by the circuitry of the destination machine;
in response to determining the non-native language is unsupported by the circuitry of the destination machine, identifying the instructions included in the un-translated data;
generate translated data in a native language that is supported by the circuitry of the destination machine, wherein the new data includes translated instructions in the native language that correspond to the un-translated instructions; and
provide the translated data to the circuitry of the destination machine over the second logical channel.

19. The apparatus of claim 18, wherein the translation processor is further configured to provide a fourth logical channel configured to provide native return data generated by the destination machine in response to the translated data, wherein the native return data is directed to the second host machine.

20. The apparatus of claim 19, wherein the translation processor is further configured to translate the native return data to be formatted in accordance with the non-native language of the second host machine.

21. The apparatus of claim 16, wherein the translation processor is further configured to provide two additional internal logical channels configured to conduct internal communications with the circuitry of the destination machine.

22. The apparatus of claim 16, wherein the translation processor is embedded in the destination machine.

23. The apparatus of claim 16, wherein the translation processor is located remote from the destination machine.

\* \* \* \* \*

UNITED STATES PATENT AND TRADEMARK OFFICE
CERTIFICATE OF CORRECTION

PATENT NO. : 8,861,007 B2  
APPLICATION NO. : 13/856979  
DATED : October 14, 2014  
INVENTOR(S) : David A. Langevin et al.

Page 1 of 1

It is certified that error appears in the above-identified patent and that said Letters Patent is hereby corrected as shown below:

In the Claims

In Claim 10, at Column 14, line 20,
delete "includes to"
and replace it with -- includes instructions to --.

In Claim 10, at Column 14, line 34,
delete "with circuitry"
and replace it with -- with the circuitry --.

Signed and Sealed this  
Seventh Day of April, 2015

Michelle K. Lee  
*Director of the United States Patent and Trademark Office*